759X
Sellers & Bantle.
Cordage Mach.
Patented May 5, 1807.
Patented Specification Available
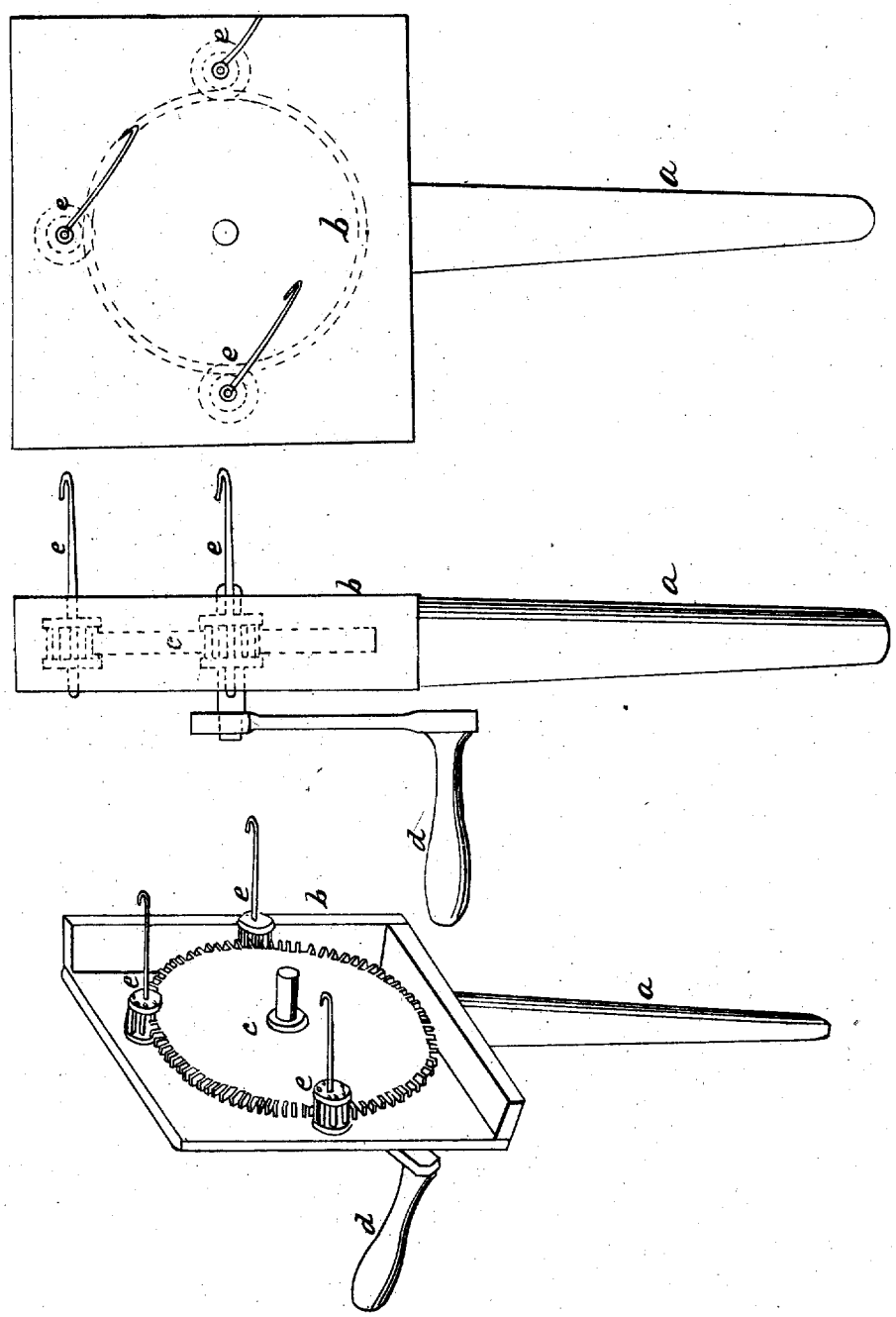

759X [illegible] May 5 1807 [illegible]

John Sellers and Andrew Bartle
Letters Patent

Dated May 5. 1807 - - - -

The Schedule referred to in these Letters Patent and making part of the same containing a description in the words of the said John Sellers and Andrew Bartle themselves of their machine for making ropes of any size as also for spinning Spunyarn, Log lines, Fishing lines, marling &c.

---

This machine consists of a box supported by a perpendicular stantion wh slips into the wind lass of a ship when used on board or into a mortice or is secured to a post or frame if used on shore. In the box is contained a principal wheel and three spindles. The principal wheel is turned by a crank or winch fixed on the axis thereof which projects beyond the box on the side opposite to the spindles. The teeth of this wheel are on its edge & may be of such a number proportioned to the teeth on the swallower of the spindles as may be deemed proper to give them the requisite velocity. The spindles and swallowers thereon are three in number inserted in the same box with the principal wheel and having their spindles projecting on the opposite side to that on which the handle is placed. These swallowers work into the teeth of the principal wheel & are turned by it with any required velocity. The yarn or strands are fastened to the ends of the spindles by holes or hooks and spun separately thereby or laid together for ropes by motion of the machine. The box which forms the frame of this machine is put together by bolts & keys so that it can be easily taken to pieces and removed or stowed in a small compass. One or more of the spindles may be used at a time as the men on ship board can be spared to this employment from the other duties on board the vessel.

Witnesses
Ch. H. P. Briscoe
Wm. McDaniel

John Sellers
Andrew Bartle

Exd
Wg

[illegible]

[illegible]